(12) United States Patent
Hong et al.

(10) Patent No.: US 11,867,197 B2
(45) Date of Patent: Jan. 9, 2024

(54) FAN MOTOR

(71) Applicant: LG Electronics Inc., Seoul (KR)

(72) Inventors: Jin Hong, Seoul (KR); Kwangyong Jang, Seoul (KR); Yongdae Kim, Seoul (KR); Sunggi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 17/165,456

(22) Filed: Feb. 2, 2021

(65) Prior Publication Data

US 2021/0340996 A1 Nov. 4, 2021

(30) Foreign Application Priority Data

Apr. 29, 2020 (KR) .................. 10-2020-0052267

(51) Int. Cl.
| | | |
|---|---|---|
| *F04D 25/08* | (2006.01) | |
| *F04D 29/52* | (2006.01) | |
| *F04D 25/06* | (2006.01) | |
| *F04D 29/056* | (2006.01) | |
| *F04D 29/54* | (2006.01) | |

(Continued)

(52) U.S. Cl.
CPC .......... *F04D 29/522* (2013.01); *F04D 25/06* (2013.01); *F04D 25/0693* (2013.01); *F04D 25/08* (2013.01); *F04D 29/056* (2013.01); *F04D 29/542* (2013.01); *H02K 3/522* (2013.01); *H02K 5/161* (2013.01); *H02K 5/207* (2021.01); *H02K 7/083* (2013.01); *H02K 9/06* (2013.01); *H02K 2203/06* (2013.01); *H02K 2203/15* (2013.01)

(58) Field of Classification Search
CPC .......... H02K 3/52; H02K 3/521; H02K 3/522; H02K 2203/06; H02K 5/161; F04D 13/06; F04D 13/08; F04D 13/0693; F04B 35/04; F04B 17/03
See application file for complete search history.

(56) References Cited

U.S. PATENT DOCUMENTS

| | | | | |
|---|---|---|---|---|
| 10,098,515 | B2 * | 10/2018 | Park | ...................... F04D 25/08 |
| 2009/0010782 | A1 * | 1/2009 | Bartsch | .................. H02K 11/33 |
| | | | | 417/423.2 |

(Continued)

FOREIGN PATENT DOCUMENTS

| | | |
|---|---|---|
| CN | 209948825 | 1/2020 |
| EP | 3361607 | 8/2018 |

(Continued)

OTHER PUBLICATIONS

Office Action in Taiwanese Appln. No. 110102538, dated Aug. 5, 2021, 4 pages (English translation).

(Continued)

*Primary Examiner* — Thomas Fink
(74) *Attorney, Agent, or Firm* — Fish & Richardson P.C.

(57) ABSTRACT

A fan motor includes: a motor including a stator and a rotor, a motor housing accommodating the motor, a bearing case disposed at a lower portion of the motor housing, an impeller coupled to a rotary shaft of the motor, a vane structure disposed at a lower side of the impeller and configured to guide air, and a lead cable connector provided in the bearing case. The stator of the motor includes a core and a coil that is wound on the core, and the lead cable connector is connected to a lead cable of the coil of the stator.

17 Claims, 5 Drawing Sheets

(51) Int. Cl.
    *H02K 3/52* (2006.01)
    *H02K 5/20* (2006.01)
    *H02K 7/08* (2006.01)
    *H02K 9/06* (2006.01)
    *H02K 5/16* (2006.01)

(56) References Cited

U.S. PATENT DOCUMENTS

| | | |
|---|---|---|
| 2014/0191605 A1 | 7/2014 | Mauch et al. |
| 2015/0078939 A1 | 3/2015 | Nishizawa et al. |
| 2016/0037984 A1* | 2/2016 | Park .................. F04D 29/626 15/326 |
| 2018/0233984 A1* | 8/2018 | Ogawa ................ H02K 5/1732 |
| 2018/0252224 A1 | 9/2018 | Yamasaki et al. |
| 2018/0266438 A1* | 9/2018 | Hayamitsu ............ F04D 29/522 |
| 2018/0309340 A1* | 10/2018 | Ogawa .................... H02K 3/28 |
| 2019/0207437 A1* | 7/2019 | Oshikiri ............. F04D 25/0633 |
| 2019/0214858 A1* | 7/2019 | Oshikiri ................ F04D 29/62 |
| 2020/0059126 A1* | 2/2020 | Takahashi ............. H02K 3/522 |

FOREIGN PATENT DOCUMENTS

| | | |
|---|---|---|
| TW | 263629 | 11/1995 |
| TW | 200818668 | 4/2008 |

OTHER PUBLICATIONS

Office Action in Australian Appln. No. 2021201572, dated Oct. 27, 2021, 6 pages.

\* cited by examiner

FAN MOTOR

CROSS-REFERENCE TO RELATED APPLICATION

This application claims the benefit of the earlier filing date and the right of priority to Korean Patent Application No. 10-2020-0052267, filed on Apr. 29, 2020, the contents of which is incorporated by reference herein in its entirety.

TECHNICAL FIELD

The present disclosure relates to a fan motor.

BACKGROUND

A fan motor is an appliance that generates a suction force to suction air. The fan motor can include a motor and a fan (impeller). The motor generates a rotary force, and can include a stator and a rotor. In the fan motor, the suction force can be generated by a rotation of a fan that is connected to a rotary shaft of the motor.

The fan motor can be used for a variety of appliances. For example, the fan motor can be used for home appliances, such as cleaner, air-conditioner, hair dryer, or vehicles.

Recently, demands for portability and high output of the fan motor have increased. Therefore, an effort for miniaturization (microminiaturization) of the fan motor also increased.

A conventional fan motor, especially a high-speed small-sized fan motor, has following problems.

If the fan motor is miniaturized, components of the fan motor are also miniaturized. For example, an outer diameter of a stator of the motor becomes small. Also, a core of the stator, for example, a thickness of a back yoke becomes thin, whereby a top space of the back yoke becomes smaller. This space is generally used as a moving path for wiring of a lead cable and a neutral cable of stator coil.

However, since this space is smaller and used as a moving path of a lead cable and a neutral cable of the stator coil, it may be difficult to maintain an insulating distance. Also, if a guide structure for the stator coil, for example, a protrusion is provided in this space, it may be difficult to maintain rigidity. Moreover, since this space is smaller, assembling the fan motor is more difficult.

Further, the small-sized fan motor has output and loss greater than a volume during operation. Therefore, a temperature of the fan motor is increased and whole efficiency of the fan motor can be deteriorated.

SUMMARY

The present disclosure is directed to a fan motor.

According to one aspect of the subject matter described in this application, a fan motor includes a motor including a stator and a rotor, a motor housing accommodating the motor, a bearing case disposed at a lower portion of the motor housing, an impeller coupled to a rotary shaft of the motor, a vane structure disposed at a lower side of the impeller and configured to guide air, and a lead cable connector provided in the bearing case. The stator of the motor can include a core and a coil that is wound on the core, and the lead cable connector can be connected to a lead cable of the coil of the stator.

Implementations according to this aspect can include one or more of the following features. For example, the motor housing can accommodate the stator of the motor, and the bearing case can accommodate a bearing that supports a lower portion of the rotary shaft of the motor.

In some examples, an upper portion of the bearing case can be disposed at an inner side of the lower portion of the motor housing. In some implementations, the bearing case can include a bearing receiving portion and a plurality of legs extending from the bearing receiving portion, the lead cable connector can include a plurality of cable connectors, and the plurality of cable connectors can be coupled to the plurality of legs.

In some examples, each of the plurality of cable connectors can include (i) a contact point portion connected to the lead cable of the coil, (ii) a body connected to the contact point portion, and (iii) a terminal portion connected to the body. In some examples, the body of each of the plurality of cable connectors can be coupled to each leg of the plurality of legs of the bearing case.

In some implementations, each leg of the plurality of legs can include a horizontal portion extending from the bearing receiving portion in a horizontal direction and a vertical portion extending from the horizontal portion in a vertical direction, and the body of the each of the plurality of cable connectors can be coupled to the vertical portion of the each leg of the plurality of legs. In some examples, the vertical portion of the each leg of the plurality of legs can be coupled to the motor housing.

In some examples, the body of the each of the plurality of cable connectors can be coupled to the each leg of the plurality of legs by one of bolting, bonding, or injection molding. In some implementations, the each leg of the plurality of legs can include a horizontal portion extending from the bearing receiving portion in a horizontal direction, and the each of the plurality of cable connectors can be coupled to the horizontal portion of the each leg of the plurality of legs.

In some examples, the horizontal portion can include a first horizontal portion connected to the bearing receiving portion and a second horizontal portion that is stepped relative to the first horizontal portion, and the each of the plurality of cable connectors can be coupled to the first horizontal portion. In some implementations, the second horizontal portion of the each leg of the plurality of legs can be coupled to the motor housing.

In some implementations, the body of the each of the plurality of cable connectors can be embedded in the each leg of the plurality of legs. In some examples, the body of the each of the plurality of cable connectors can be coupled to the each leg of the plurality of legs by bolting or bonding, or the body of the each of the plurality of lead cable connectors and the each leg of the plurality of legs can be injection molded together.

In some implementations, the lead cable connector can be disposed on a path of the vane structure. In some examples, the fan motor can further include a neutral cable connector provided to be spaced apart from the lead cable connector at a predetermined distance.

According to another aspect of the subject matter described in this application, a fan motor includes a motor including a stator and a rotor, a motor housing accommodating the motor, a bearing case disposed at a lower portion of the motor housing, an impeller coupled to a rotary shaft of the motor, a vane structure disposed at a lower side of the impeller to guide air, and a lead cable connector provided in the bearing case. The bearing case can include a bearing receiving portion and a plurality of legs extending from the bearing receiving portion, and the lead cable connector can be coupled to a portion of an outer peripheral surface of each leg of the plurality of legs.

Implementations according to this aspect can include one or more following features. For example, the lead cable connector can include a plurality of cable connectors. Each of the plurality of cable connectors can define an assembly hole that corresponds to the portion of the outer peripheral surface of the each leg of the plurality of legs, and the each of the plurality of cable connectors and each leg of the plurality of legs can be coupled to each other by bolting through the assembly hole.

According to another aspect of the subject matter described in this application, a fan motor includes a motor including a stator and a rotor, a motor housing accommodating the motor, a bearing case disposed at a lower portion of the motor housing, an impeller coupled to a rotary shaft of the motor, a vane structure disposed at a lower side of the impeller to guide air, and a lead cable connector provided in the bearing case. The bearing case can include a bearing receiving portion and a plurality of legs extending from the bearing receiving portion, and the lead cable connector can be coupled to a surface of each leg of the plurality of legs that is disposed in a direction away from the vane structure.

Implementations according to this aspect can include one or more following features. For example, each leg of the plurality of legs can include a first horizontal portion and a second horizontal portion that is stepped with respect to the first horizontal portion. The lead cable connector can include a plurality of cable connectors, and each of the plurality of cable connectors can be coupled to the first horizontal portion by insert injection molding.

DETAILED DESCRIPTION

Figure 1:
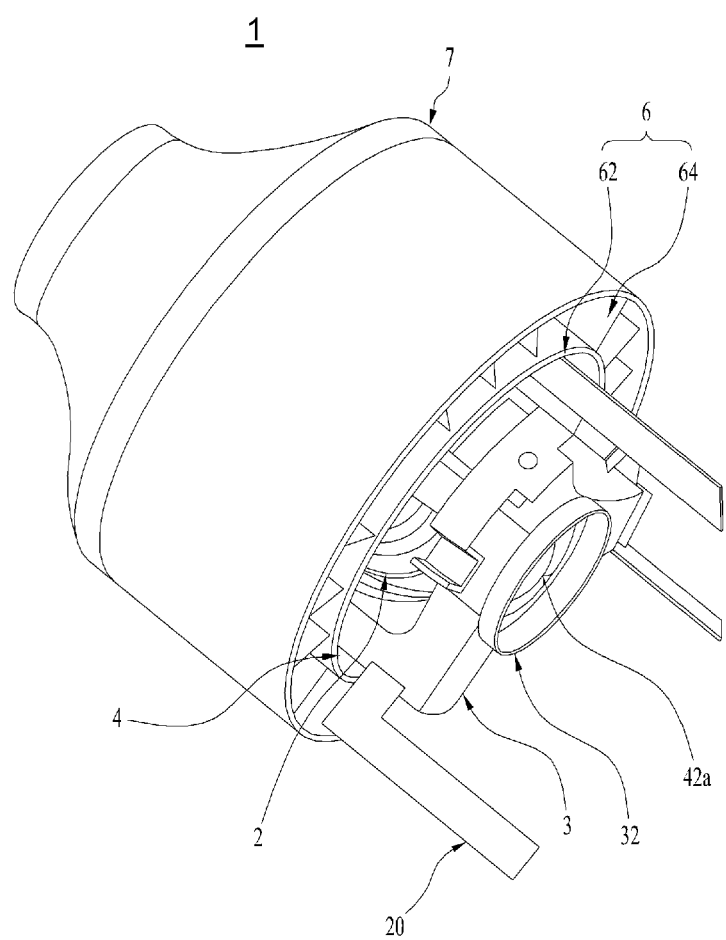
FIG. 1 is a diagram illustrating a perspective view of an exemplary fan motor.
Figure 2:
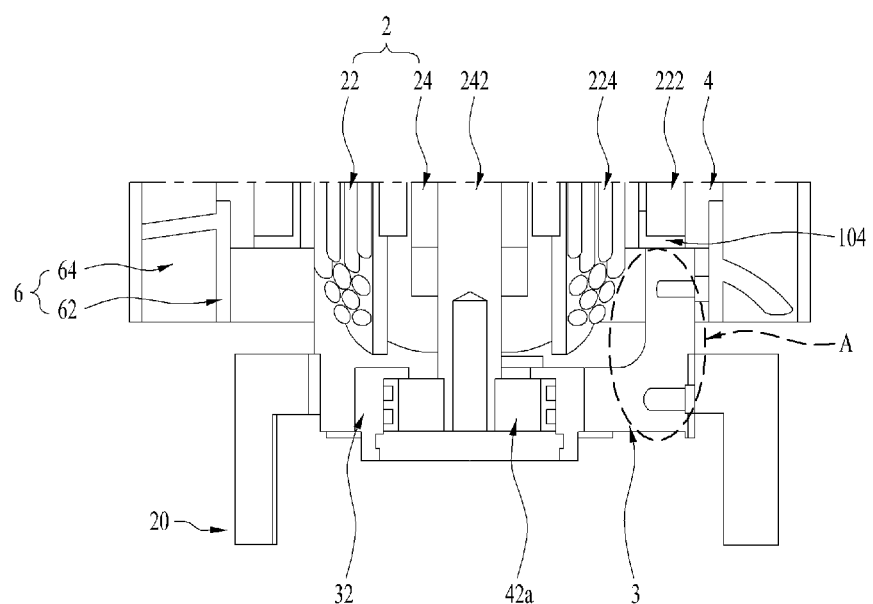
FIG. 2 is a diagram illustrating a longitudinal sectional view of the exemplary fan motor in FIG. 1.

FIG. 1 is a diagram illustrating a perspective view of an exemplary fan motor 1, and FIG. 2 is a diagram illustrating a longitudinal sectional view of the exemplary fan motor 1 in FIG. 1.

Referring to FIGS. 1 and 2, a fan motor 1 can include a motor 2, a motor housing 4, a vane structure 6, and a shroud 7.

The motor 2 can be accommodated in the motor housing 4. In some implementations, the motor 2 can be assembled into the motor housing 4.

An impeller can be coupled to an upper end of a rotary shaft of the motor 2. In some implementations, if the motor 2 is rotated, the impeller can also be rotated to generate a suction force for sucking air.

A vane structure 6 can be provided at a lower side of the impeller. The vane structure 6 can guide a flow of the air generated from the impeller. The vane structure 6 can be provided on an outer surface of the motor housing 4. In some implementations, the vane structure 6 can be provided in a plural number. For example, the vane structure 6 can be provided at an upper portion and a lower portion of the motor housing 4.

The vane structure 6 can include a plurality of vanes 64. Further, the vane structure 6 can include a hub 62 that connects the plurality of vanes 64. The hub 62 can have a hollow cylindrical shape. In some implementations, the plurality of vanes 64 can be provided on a circumferential surface outside the hub 62.

In some implementations, the motor 2, the vane structure 6, and the impeller can be arranged inside the shroud 7. The motor housing 4 can also be arranged inside the shroud 7. The shroud 7 can have a hollow cylindrical shape. An opening defined at an upper portion of the shroud 7 can be an inlet through which the air enters.

The motor 2 will be described more in detail with reference to FIG. 2.

The motor 2 can include a stator 22 and a rotor 24. The stator 22 can be fixed to the motor housing 4, and the rotor 24 can be rotatably provided at the center of the motor housing 4.

The motor housing 4 can have a hollow cylindrical shape. The motor housing 4 can be longitudinally provided in a shaft direction to accommodate most of the stator 22 therein.

A bearing case 3 can be arranged at a lower side of the motor housing 4. An upper end of the bearing case 3 can be coupled to the lower end of the motor housing 4.

In some implementations, upper and lower sides of a rotary shaft 242 of the rotor 24 can be rotatably supported in an upper bearing and a lower bearing 42a, respectively.

An upper bearing housing can be provided at the upper side of the motor housing 4. The lower bearing 42a can be provided in the bearing case 3.

Figure 3:
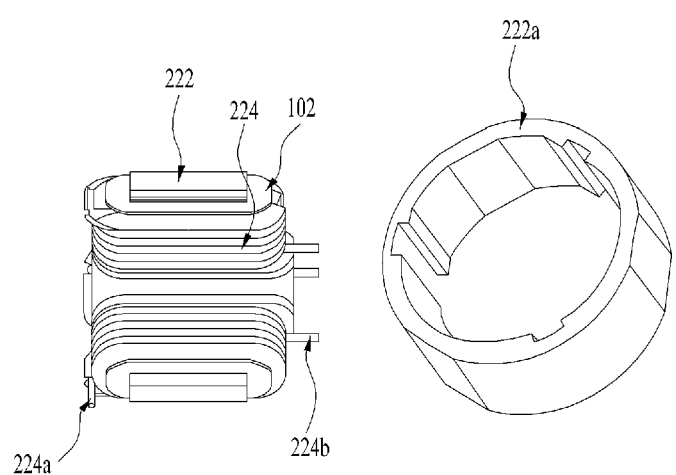
FIG. 3 is a diagram illustrating an exploded perspective view of a stator in FIG. 2.

The stator 22 of the motor 2 will be described more in detail with reference to FIG. 3.

The stator 22 of the motor 2 can include a core 222 and a coil 224 wound on the core 222. A teeth-divisional core can be used as the core 222, and a concentrated winding can be applied to the coil 224. The coil 224 wound on the teeth-divisional core can be assembled into a back yoke 222a in a shaft direction.

A first insulator 102 for insulation can be provided between the teeth-divisional core 222 and the coil 224. In some implementations, a second insulator for insulating the back yoke 222a can be provided. The first insulator 102 and the second insulator can be provided separately or in a single body.

In some implementations, the motor 2 can be a three-phase motor. The coil 224 of the stator 22 can include a three-phase (UVW-output to motor) lead cable 224b (hereinafter, referred to as 'lead cable'). The lead cable 224b can be disposed at the lower side of the coil 224. The coil 224 of the stator 22 can include a neutral cable 224a. The neutral cable 224a can be disposed at the upper side of the coil 224.

A wiring structure for the neutral cable 224a and the lead cable 224b of the coil 224 of the stator 22 can be required for the fan motor 1.

Figure 4:
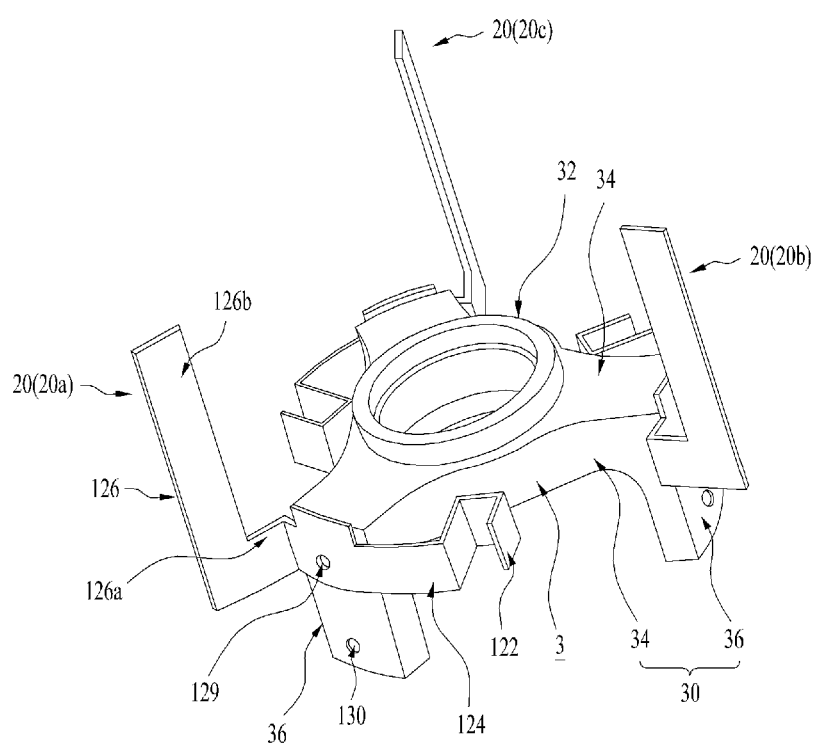
FIG. 4 is a diagram illustrating a bottom perspective view of an exemplary wiring structure of a lead cable in FIG. 2.

The wiring structure of the lead cable 224b will be described with reference to FIGS. 2 and 4.

As depicted in FIG. 2, a lead cable connector 20 can be provided outside of the fan motor 1 to solve a spatial restriction caused by miniaturization of the fan motor.

The lead cable connector 20 can be provided in the bearing case 3. The lead cable connector 20 can be coupled to a predetermined position of the bearing case 3.

The bearing case 3 and the lead cable connector 20 will be described in detail with reference to FIG. 4. FIG. 4 is a diagram illustrating the bearing case 3 viewed from the bottom.

The bearing case 3 can include a bearing receiving portion 32 on which a lower bearing 42a is seated. The bearing receiving portion 32 can have a concave cylindrical shape.

A plurality of legs 30 can be radially provided outside the bearing receiving portion 32. The legs 30 can include a horizontal portion 34 and a vertical portion 36.

The horizontal portion 34 can extend from the bearing receiving portion 32 to the outside in an approximately horizontal direction. The vertical portion 36 can extend from a front end of the horizontal portion 34 in an approximately vertical direction.

The vertical portion 36 of the legs 30 can be inserted into the lower portion of the motor housing 4 and coupled to the motor housing 4. To this end, an assembly hole 130 can be provided in the vertical portion 36 of the legs 30.

In some implementations, the lead cable connector 20 can be provided in the bearing case 3. The lead cable connector 20 can be arranged at the outside of the bearing case 3, for example, at the legs 30.

For example, the lead cable connector 20 can be coupled to an outer surface of the vertical portion 36 of the legs 30. Also, the lead cable connector 20 can be arranged to adjoin the lower side of the coil 224 such that the lead cable connector 20 can be easily connected to the lead cable 224b of the coil 224.

The lead cable connector 20 can include lead cable connectors 20a, 20b and 20c for U, V, and W. The three lead cable connectors 20a, 20b and 20c can substantially have the same structure.

The lead cable connector 20 can include a contact point portion 122 electrically connected to the lead cable 224b of the coil 224, and a body 124 connected with the contact point portion 122. A terminal portion 126 can be connected to a front end of the body 124.

The contact point portion 122, the body 124, and the terminal portion 126 can be thin plate shaped members.

The contact point portion 122 can be arranged to adjoin the lower side of the stator 22. The contact point portion 122 can have a shape similar to 'U', but the shape of the contact point portion 122 is not necessarily limited. In a state in which the lead cable 224b of the coil 224 is fitted between the contact point portion 122, both sides of the contact point portion 122 can be pushed and then fixed using soldering, welding, etc.

The body 124 can be coupled to the vertical portion 36 of the bearing case 3. The body 124 can have a predetermined curvature. An assembly hole 129 can be provided in the body 124 and coupled to the bearing case 3 by bolting. Coupling of the body 124 and the bearing case 3 is not limited to bolting, and the body 124 and the bearing case 3 can be coupled to each other by other methods, such as bonding, sliding, injection molding, insert injection molding, etc.

The terminal portion 126 can include a horizontal portion 126a extending from a front end of the body 124 in an approximately horizontal direction. The terminal portion 126 can include a vertical portion 126b extending from the horizontal portion 126a in an approximately vertical direction. The terminal portion 126 can be electrically connected to an inverter.

In some implementations, the vane structure 6 can be arranged outside the lead cable connector 20. Further, the lead cable connector 20 can be arranged on a path made by the vane structure 6 (see FIG. 2).

The motor housing 4 and the bearing case 3 can be made of an insulating member, for example, a polymer. The vane structure 6 can be made of an insulating member, for example, a polymer. Since the lead cable connector 20 is arranged on an outer surface of the bearing case 3 that is an insulating member, the lead cable connector 20 can be electrically insulated.

In order to solve a spatial restriction caused by miniaturization of the fan motor, a neutral cable connector for wiring the neutral cable 224a can be provided to be spaced apart from the lead cable connector 20. The neutral cable connector can be arranged at the upper side of the motor housing 4. The neutral cable connector can be arranged to adjoin the upper side of the coil 224.

Figure 5:
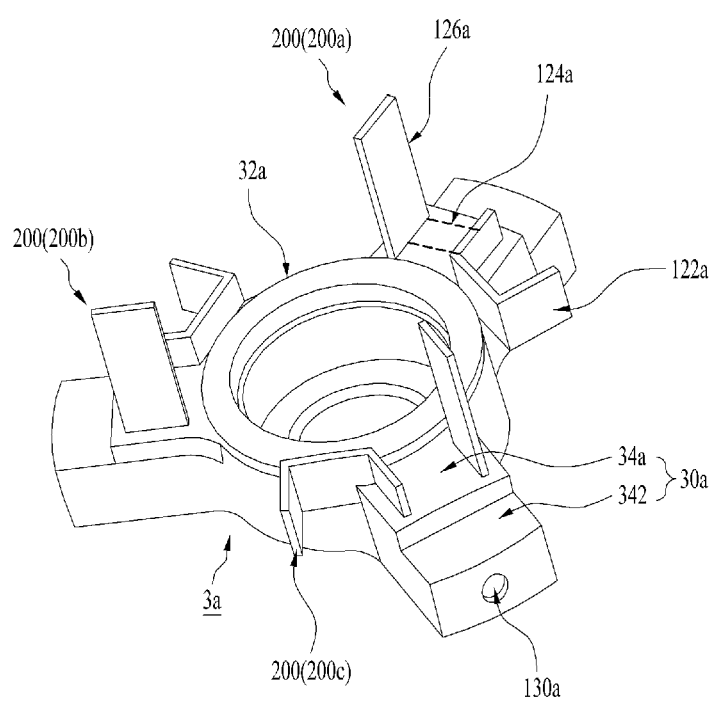
FIG. 5 is a diagram illustrating a bottom perspective view of another exemplary wiring structure of a lead cable in FIG. 2.

Another implementation of the bearing case 3a and the lead cable connector 200 will be described with reference to FIG. 5.

The bearing case 3a can include a bearing receiving portion 32a on which the lower bearing 42a is seated. The bearing receiving portion 32a can have a concave cylindrical shape.

A plurality of legs 30a can be radially provided outside the bearing receiving portion 32a. The legs 30a can extend from the bearing receiving portion 32a to the outside in an approximately horizontal direction. The legs 30a can include a first horizontal portion 34a and a second horizontal portion 342. The first horizontal portion 34a and the second horizontal portion 342 can have a predetermined step difference. For example, the second horizontal portion 342 can be stepped vertically downward relative to the first horizontal portion 34a.

The legs 30a can be inserted into the lower portion of the motor housing 4 and then coupled to the motor housing 4. The legs 30a can be provided with an assembly hole 130a for assembly.

In some implementations, the lead cable connector 200 can be provided in the bearing case 3a. The lead cable connector 200 can be arranged in the legs 30a. The lead cable connector 200 can be arranged on the bottom of the legs 30a. For example, the lead cable connector 200 can be provided in the first horizontal portion 34a of the legs 30a.

The lead cable connector 200 can include lead cable connectors 200a, 200b, and 200c for U, V, and W. The three lead cable connectors 200a, 200b, and 200c can substantially have the same structure.

The lead cable connector 200 can include a contact point portion 122a that is electrically connected to the lead cable 224b of the coil 224, and a body 124a that is connected to the contact point portion 122a. A horizontal portion 126a can be connected to a front end of the body 124a.

The contact point portion 122a, the body 124a, and the horizontal portion 126a can be thin plate shaped members.

The contact point portion 122a can be arranged to adjoin the lower side of the stator 22. The contact point portion 122 can have a shape similar to 'U', but the shape of the contact point portion 122 is not limited. The contact point portion 122a can be partially embedded in the legs 30a.

The body 124a can be embedded in the legs 30a of the bearing case 3a.

The horizontal portion 126a can extend from the body 124a in an approximately vertical direction. The horizontal portion 126a can be partially embedded in the legs 30a. Since the lead cable connector 200 is embedded in the bearing case 3a that is an insulating material, the lead cable connector 200 can be electrically insulated.

The lead cable connector 200 can be coupled to the bearing case 3a by injection molding, for example, an insert injection molding. The lead cable connector 200 can be coupled to the bearing case 3a by bolting, bonding, sliding, etc.

In the conventional fan motor, a lead cable connector is arranged in a predetermined space (e.g., Space A inside the motor 2 in FIG. 2) in a motor. However, referring to FIGS. 2, 4, and 5, the lead cable connectors 20 and 200 can be arranged outside of the motor 2, that is, at the bearing case 3.

For example, the lead cable connectors 20 and 200 may not be provided in the predetermined space A inside the motor 2 as depicted in FIG. 2. Therefore, the fan motor can be miniaturized. Also, the predetermined space A inside the motor 2 of the fan motor 1 can be used for another purpose. For example, a structure can be reinforced in the space A.

Further, since the lead cable connectors 20 and 200 are provided in the bearing case 3 made of an insulating member, they can be electrically insulated.

Furthermore, since the neutral cable connector is arranged to be spaced apart from the lead cable connectors 20 and 200 at a predetermined distance, an insulating distance can be maintained to maintain insulation strength.

Moreover, the neutral cable connector and the lead cable connectors 20 and 200 can be arranged in the path of the vane structure 6. Therefore, heat generated from the lead cable connectors 20 and 200, heat generated from the neutral cable connector, and heat inside the motor 2 can be transferred to the air flowing in the path of the vane structure 6. Therefore, heat emission performance of the fan motor can be improved.

In some implementations, since the teeth-divisional core of the stator 22 is fixed in a shaft direction, assembly of the motor can be improved.

What is claimed is:

1. A fan motor comprising:
   a motor including a stator and a rotor;
   a motor housing accommodating the motor;
   a bearing case disposed at a lower portion of the motor housing;
   an impeller coupled to a rotary shaft of the motor;
   a vane structure disposed at a lower side of the impeller and configured to guide air; and
   a lead cable connector provided in the bearing case,
   wherein the stator of the motor includes a core and a coil that is wound on the core,
   wherein the lead cable connector is connected to a lead cable of the coil of the stator,
   wherein the bearing case includes a bearing receiving portion and a plurality of legs extending from the bearing receiving portion, and
   wherein the lead cable connector includes a contact point portion connected to the lead cable of the coil, a body disposed on an outer circumferential portion of a leg of the plurality of legs and connected to the contact point portion, and a terminal portion connected to the body.

2. The fan motor of claim 1, wherein the motor housing accommodates the stator of the motor, and the bearing case accommodates a bearing that supports a lower portion of the rotary shaft of the motor.

3. The fan motor of claim 2, wherein an upper portion of the bearing case is disposed at an inner side of the lower portion of the motor housing.

4. The fan motor of claim 1, wherein:
   the lead cable connector includes a plurality of cable connectors, and
   the plurality of cable connectors are coupled to the plurality of legs.

5. The fan motor of claim 4, wherein the body of each of the plurality of cable connectors is coupled to each leg of the plurality of legs of the bearing case.

6. The fan motor of claim 5, wherein each leg of the plurality of legs includes a horizontal portion extending from the bearing receiving portion in a horizontal direction and a vertical portion extending from the horizontal portion in a vertical direction, and
   wherein the body of the each of the plurality of cable connectors is coupled to the vertical portion of the each leg of the plurality of legs.

7. The fan motor of claim 6, wherein the vertical portion of the each leg of the plurality of legs is coupled to the motor housing.

8. The fan motor of claim 7, wherein the body of the each of the plurality of cable connectors is coupled to the each leg of the plurality of legs by one of bolting, bonding, or injection molding.

9. The fan motor of claim 5, wherein the each leg of the plurality of legs includes a horizontal portion extending from the bearing receiving portion in a horizontal direction, and the each of the plurality of cable connectors is coupled to the horizontal portion of the each leg of the plurality of legs.

10. The fan motor of claim 9, wherein the horizontal portion includes a first horizontal portion connected to the bearing receiving portion and a second horizontal portion that is stepped relative to the first horizontal portion, and
    wherein the each of the plurality of cable connectors is coupled to the first horizontal portion.

11. The fan motor of claim 10, wherein the second horizontal portion of the each leg of the plurality of legs is coupled to the motor housing.

12. The fan motor of claim 11, wherein the body of the each of the plurality of cable connectors is embedded in the each leg of the plurality of legs.

13. The fan motor of claim 12, wherein the body of the each of the plurality of cable connectors is coupled to the each leg of the plurality of legs by bolting or bonding, or
    wherein the body of the each of the plurality of cable connectors and the each leg of the plurality of legs are injection molded together.

14. The fan motor of claim 1, wherein the lead cable connector is disposed on a path of the vane structure.

15. The fan motor of claim 14, further comprising:
    a neutral cable connector provided to be spaced apart from the lead cable connector at a predetermined distance.

16. A fan motor comprising:
    a motor including a stator and a rotor;
    a motor housing accommodating the motor;
    a bearing case disposed at a lower portion of the motor housing;
    an impeller coupled to a rotary shaft of the motor;
    a vane structure disposed at a lower side of the impeller to guide air; and
    a lead cable connector provided in the bearing case,
    wherein the bearing case includes a bearing receiving portion and a plurality of legs extending from the bearing receiving portion, and
    wherein the lead cable connector includes a contact point portion connected to a portion of the stator, a body disposed on an outer circumferential portion of a leg of the plurality of legs and connected to the contact point portion, and a terminal portion connected to the body.

17. The fan motor of claim 16,
wherein the lead cable connector includes a plurality of cable connectors,
wherein each of the plurality of cable connectors defines an assembly hole that corresponds to a portion of an outer peripheral surface of the each leg of the plurality of legs, and
wherein the each of the plurality of cable connectors and each leg of the plurality of legs are coupled to each other by bolting through the assembly hole.

\* \* \* \* \*